No. 759,514. PATENTED MAY 10, 1904.
T. GRANT, DEC'D.
W. T. HOLT, ADMINISTRATOR.
COMBINED VALVE AND PACKING.
APPLICATION FILED APR. 2, 1901.
NO MODEL.
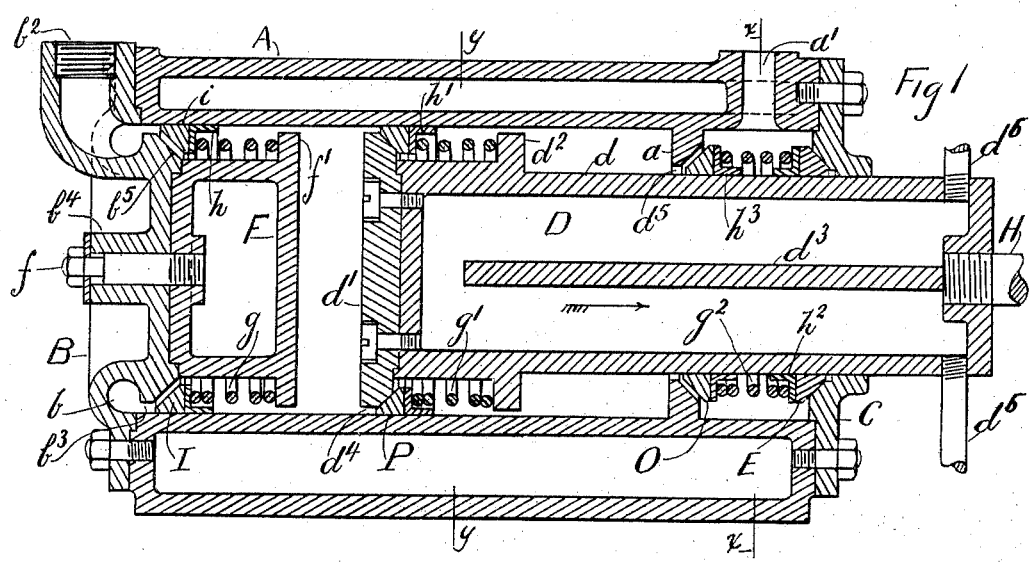
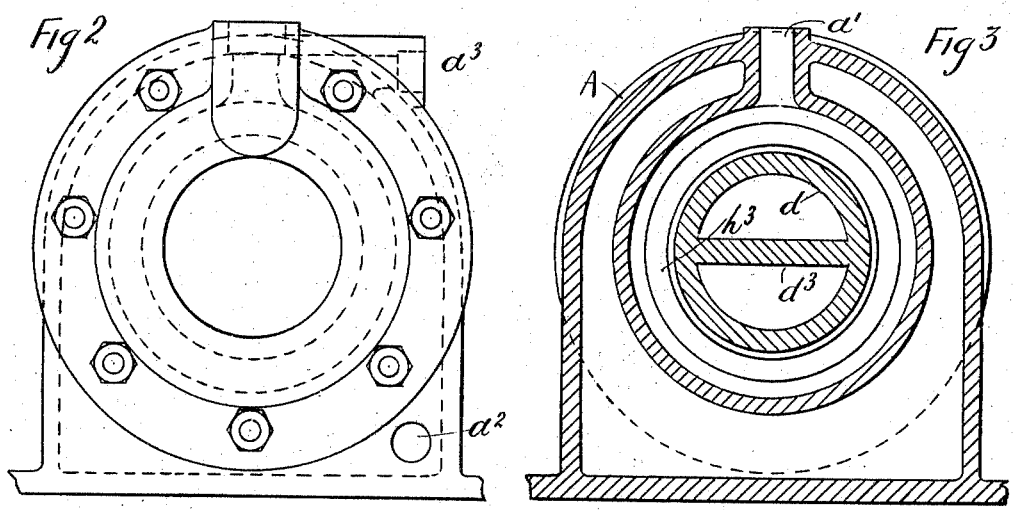
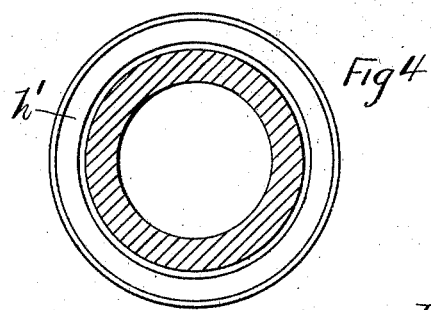
Witnesses
C. A. Harris
William Franck
Inventor
Thomas Grant
By his Attorney
A. A. de Bonneville No. 759,514. Patented May 10, 1904.

UNITED STATES PATENT OFFICE.

THOMAS GRANT, OF TOTTENVILLE, NEW YORK, ASSIGNOR OF ONE-HALF TO HARTWIG A. COHEN, OF DELAMAR, NEVADA; WILLIAM T. HOLT ADMINISTRATOR OF SAID THOMAS GRANT, DECEASED.

COMBINED VALVE AND PACKING.

SPECIFICATION forming part of Letters Patent No. 759,514, dated May 10, 1904.

Application filed April 2, 1901. Serial No. 54,036. (No model.)

*To all whom it may concern:*

Be it known that I, THOMAS GRANT, a citizen of the United States, and a resident of Tottenville, borough of Richmond, in the county of Richmond and State of New York, have invented certain new and useful Improvements in a Combined Valve and Packing, of which the following is a specification.

My invention relates to combined valves and packings.

The object of the invention is the production of a cylinder with a piston in which the valves actuating therein also constitute packings.

In the accompanying drawings my invention is shown applied to a compressor, and it is evident that the improvements may be applied to many different types of cylinders with reciprocating pistons.

Figure 1 shows a vertical axial longitudinal section of a compressor with my improved combined packings and valves. Fig. 2 represents an end view of Fig. 1. Fig. 3 shows a section of Fig. 1 on the line $x\ x$. Fig. 4 is a partial section of Fig. 1 on the line $y\ y$.

The compressor is shown to consist of the water-jacketed cylinder A with cylinder-heads B and C, a reciprocating plunger D actuating therein, an inlet-valve I, plunger-valve P, outlet-valve O, and plunger-packing E. The cylinder-head B is bolted to the barrel of the cylinder in the ordinary way and contains a circular cavity $b$, which constitutes a reservoir or receiving-chamber for the inlet-opening $b^2$, and the said reservoir communicates with the inside of the cylinder through the annular port $b^3$, which is obtained by making the inside end of the cylinder-head B smaller in diameter than the internal diameter of the cylinder.

A retaining-barrel F is secured to the cylinder-head B with the bolt $f$, which passes through the hollow boss $b^4$. The ring F' projects from the end of the barrel F and is smaller than the internal diameter of the cylinder A and supports the spring $g$, on the end of which is placed the angular ring $h$, butting against the flexible inlet-valve and packing I.

The plunger D consists of the barrel $d$ with the enlarged head $d'$ bolted thereto, which latter is smaller than the internal diameter of the cylinder A to enable it to actuate as a transfer-piston. A ring $d^2$, smaller than the internal diameter of the cylinder, projects from the barrel $d$ and supports a spring $g'$, on the end of which is placed the angular ring $h'$, which butts against the flexible plunger-valve and packing P. The plunger D is made of two diameters to secure the compression of the air or vapor during both its forward and backward strokes, and its smaller diameter is large enough for its proper maintenance through the cylinder-head C. It is made hollow for lightness and to allow a circulation of water through the same by means of the division-plate $d^3$ and piping $d^6$.

An internal beveled ring $a$ projects from the cylinder A with an internal diameter larger than the barrel $d$. A flexible ring E butts against the cylinder-head C with an angular ring $h^2$ adjacent to the same, and a spring $g^2$ is secured next to the said ring, which spring is covered by a second angular ring $h^3$, against which latter butts the flexible outlet-valve O.

It will be noted that the valve I is beveled on its inner face to suit its seat $b^5$ on the cylinder-head B, and the outside cylindrical surface $i$ fits against the internal surface of the barrel A, and the ring-valve I being made of flexible material will effectually close the circular port $b^3$ when it is on its seat.

The ring-valves P and O are of similar shape and material and tightly close the ports $d^4$ and $d^5$, respectively.

The ring-packing E is beveled on its external surface and effectually packs the barrel $d$, which reciprocates through the cylinder-head C.

An outlet-passage $a'$ is provided between the ring $a$ and the cylinder-head C, and the openings $a^2\ a^3$ allow water circulation in the jacket of the cylinder.

To operate the compressor, the plunger is reciprocated by any suitable source of power through the rod H, and when the plunger is moving in the direction shown by the arrow the inlet-valve I is opened by the suction of the plunger, the valve P is closed by the pressure on the front side of the same, and the outlet-valve O is kept open. A quantity of air or vapor is drawn into the barrel of the cylinder between the cylinder-head B and the enlarged head $d'$ of the plunger, and the air or vapor on the other side of the enlarged head is both compressed and forced through the outlet-valve O and opening $a'$. On the return stroke of the plunger in the opposite direction of the arrow the pressure in the cylinder closes the inlet-valve I, opens the valve P, and closes the outlet-valve O. While the plunger is moving in the latter direction, the air or vapor is transferred from the inlet to the outlet end of the cylinder and is at the same time compressed by virtue of the space displaced by the entering of the plunger D into the cylinder. When the plunger again moves in the direction shown by the arrow, the air or vapor between the enlarged head $d'$ and the valve O is again compressed, and when it reaches a higher pressure than the air or vapor contained beyond the outlet-valve O the said valve opens to allow the escape of the compressed air or gas.

It will plainly be seen that by this novel combination of parts a compound compressor is obtained with only one cylinder and that combined valves and packings are secured which can be maintained absolutely tight.

Having described my invention, I desire to secure by United States Letters Patent and claim—

1. The combination of a plunger, a cylinder-head with a beveled seat through which said plunger passes, an annular projection $a$ on the inner surface of said cylinder and having a beveled valve-seat, a port being left between said projection and said plunger, wedge-shaped rings of yielding material fitting around said plunger, and a single spring for pressing said rings against said seats.

2. The combination of a cylinder of a given diameter, a plunger-head of smaller diameter having a beveled periphery and serving as a valve-seat, annular ports $b^3$, $d^5$, for said cylinder and having beveled valve-seats, wedge-shaped annular packing-valves of yielding material fitting all of said seats, and springs pressing said valves against said beveled valve-seats and against the inner surface of said cylinder, said valves being adapted to be opened by pressure opposed to that exerted by the springs.

3. In a compressor the combination of a cylinder of a given diameter, a plunger with a plunger-head of smaller diameter than the cylinder, the plunger-head having a beveled periphery, a wedge-shaped annular packing-valve of yielding material fitting said plunger-head, a flange upon the plunger, a spring pressing from said flange upon said valve to press it against the beveled periphery of the plunger-head, an annular port with beveled valve-seat in the cylinder-head B of said compressor, a second wedge-shaped annular valve of yielding material, a spring forcing said valve against said seat and against the inner surface of said cylinder, a second cylinder-head C through which said plunger passes, and having a beveled packing-seat, an annular projection $a$ on the inner surface of said cylinder, and having between said projection and said plunger, a beveled valve-seat, a port being formed wedge-shaped rings of yielding material fitting around said plunger, and a spring forcing the last two named rings against their respective seats.

Signed at New York, in the county of New York and State of New York, this 28th day of March, A. D. 1901.

THOMAS GRANT. [L. S.]

Witnesses:
  C. B. HARRIS,
  WM P. FRANCE.